United States Patent
Brancaleone et al.

[11] Patent Number: 6,045,174
[45] Date of Patent: Apr. 4, 2000

[54] VEHICLE SEAT WITH SUPPORT ASSEMBLY

[75] Inventors: Robert Anthony Brancaleone, Royal Oak; Kalyanaraman Bharathan, Canton, both of Mich.

[73] Assignee: Ford Global Technologies, Inc., Dearborn, Mich.

[21] Appl. No.: 09/144,129

[22] Filed: Aug. 31, 1998

[51] Int. Cl.$^7$ ...................................................... B60N 2/00
[52] U.S. Cl. ............................ 296/63; 296/68.1; 296/204
[58] Field of Search ............................ 296/63, 68.1, 204; 297/216.1

[56] References Cited

U.S. PATENT DOCUMENTS

| | | | |
|---|---|---|---|
| 2,880,815 | 4/1959 | Apfelbaum . | |
| 3,922,029 | 11/1975 | Urai | 296/68.1 |
| 4,231,589 | 11/1980 | Hodgkins et al. | 296/63 |
| 4,583,782 | 4/1986 | Mikuniya | 296/63 |
| 4,638,546 | 1/1987 | Benshoof | 296/63 |
| 4,685,716 | 8/1987 | Kondo | 296/63 |
| 4,927,201 | 5/1990 | Froutzis | 296/63 |
| 4,978,097 | 12/1990 | Froutzis | 296/68.1 |
| 5,069,482 | 12/1991 | Fohl . | |
| 5,215,347 | 6/1993 | Klink . | |
| 5,344,188 | 9/1994 | Mims et al. . | |
| 5,415,430 | 5/1995 | Valasin . | |
| 5,464,252 | 11/1995 | Kanazawa et al. . | |
| 5,527,080 | 6/1996 | Whlqvist | 296/63 |
| 5,584,525 | 12/1996 | Nakano et al. | 296/68.1 |
| 5,720,463 | 2/1998 | Wisner et al. . | |
| 5,967,604 | 10/1999 | Yoshida et al. | 296/68.1 |

FOREIGN PATENT DOCUMENTS

| | | |
|---|---|---|
| 1284857 | 7/1960 | Germany . |
| 19 61 381 | 6/1971 | Germany . |
| 55-83621 | 6/1980 | Japan . |
| 62-55242 | 3/1987 | Japan . |
| 6-56052 | 3/1994 | Japan . |
| 395098 | 7/1933 | United Kingdom . |

*Primary Examiner*—Joseph D. Pape
*Assistant Examiner*—Kiran Patel
*Attorney, Agent, or Firm*—David B. Kelly

[57] ABSTRACT

A seat support assembly for an automotive vehicle with a seat having integrated occupant restraints has forward and rearward transversely extending seat support members each having opposed ends with a seat attachment section and an attachment flange. A pair of seat reinforcement members are positioned adjacent and underside of the attachment section on each of the opposed ends of the forward and rearward seat support members, each of the pair seat support reinforcements members having a mating flange adapted for mating between the attachment flange and a portion of the vehicle floor pan. A floor pan reinforcement member is adapted for mating with an underside of the floor pan and has a support flange wrapping around an outer side adjacent the mating flange and the attachment flange. The seat is connected by seat brackets to the seat attachment sections of the seat support members via a bolt and bolt sleeve combination which maintains the seat support member in spaced relationship with the floor pan and provides increased load absorption from the seat.

7 Claims, 4 Drawing Sheets

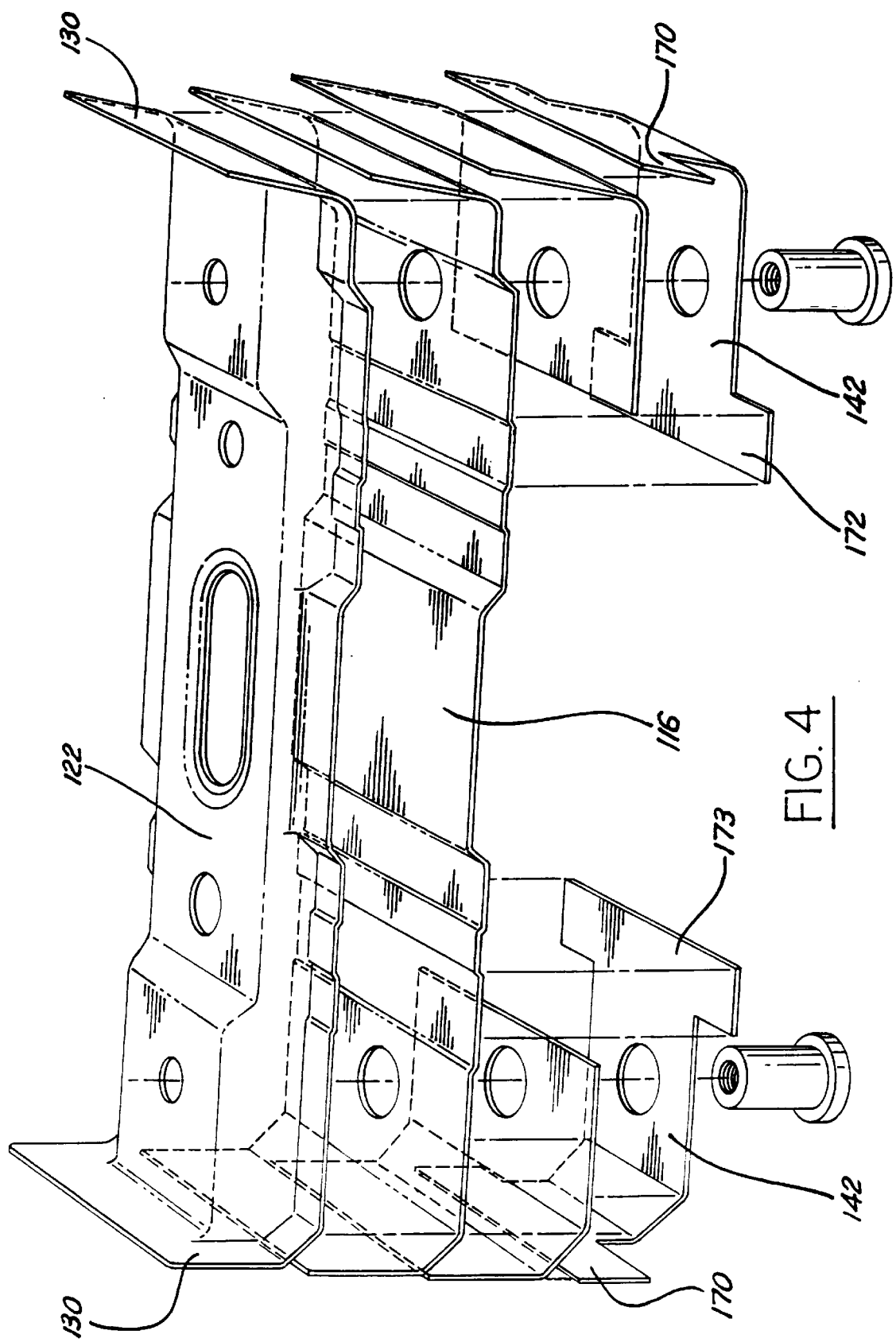

VEHICLE SEAT WITH SUPPORT ASSEMBLY

FIELD OF THE INVENTION

The present invention relates to vehicle seats in general, and more specifically to vehicle seat mounting assemblies.

BACKGROUND OF THE INVENTION

It is known to mount a vehicle seat having a seat support, or seat bracket, on a bottom of thereof, to a floor pan or to a seat cross-member attached to a floor pan. Various seat mounting assemblies have been devised. For example, in Japanese patent 56,052, a seat support 12 attached to a rod 20 by a nut 15, the rod 20 being attached to vertically spaced vehicle members 22 and 15a by a resilient bushings, as seen in FIG. 7 of the patent. In British patent 395,098, to vertically spaced vehicle panels 6 are separated by a vertically extending member 1 surrounding a bolt 10 which is tightened to connect the vehicle panels. Similarly, in German patent 1,284,857, two vertically spaced vehicle panels 6, 7 are separated by a U-shaped member 1 having flanges 2, the U-shaped member being attached to the lower panel 6 by a snap fitting element 5. The Japanese patent 83,621 discloses transversely extending vehicle seat supports, or mounting brackets 2, for supporting a seat on a floor panel 1. A stud bolt 3 is fitted in a mounting hole of the mounting bracket 2 and the stud bolt 3 is fitted into a mounting hole in the floor panel 1 and the mounting hole in a reinforcement 4 under the floor panel.

With the onset of seat integrated restraints, the seat may transmit a higher load to the front floor pan. This may occur since the seat integrated restraint concept incorporates the B-pillar retractor and seat belt connections onto the back of the seat. Thus, in a seat integrated restraint seating system, the floor pan must withstand the full force of a restrained occupant, whereas in a conventional seating system, the B-pillar and body shell would absorb some the load. Conventional seat mounting systems, such as those described above, may not provide sufficient strength. The need exists, therefore, for a vehicle seat assembly which will adequately accommodate seat integrated restraints.

SUMMARY OF THE INVENTION

The present invention provides a new and improved vehicle seat anchorage system which meets the requirements for a vehicle seat with integrated restraints. The seat support assembly of the present invention comprises at least one transversely extending seat support member having opposed ends, each of which has a seat attachment section and an attachment flange. A seat support reinforcement member is located adjacent and underside of the attachment section on each of the opposed ends with a mating flange adapted for mating between the attachment flange and an upstanding side portion of the floor pan. A floor pan reinforcement member is adapted for mating with an underside of the floor pan and preferably wraps around an outer side of the floor pan adjacent the mating flange and the attachment flange. The assembly is attached to the seat by seat attachment means which connect seat brackets to the seat support member, the seat attachment means being anchored to an underside floor pan reinforcement member. Preferably, the seat attachment means comprises a bolt sleeve passing through openings in the reinforcement member and the floor pan which has a bolt receiving aperture and a first and adjacent a bolt hole in the seat support member and a sleeve head on a second and adjacent and underside surface of the floor pan reinforcement member. The bolt sleeve has a threaded inter surface for receiving a bolt attached to the seat bracket, through a bolt hole in the seat support member, and into the bolt sleeve. An advantage of the present invention is a seat support assembly for an automotive vehicle which provides sufficient anchorage and support for a vehicle seat having seat integrated restraints.

Another advantage of the present invention is a vehicle seat support assembly which is convenient to assemble and inexpensive to manufacture.

A feature of the present invention is a floor pan reinforcement member adapted for mating with the underside of the floor pan and wrapping around an outside of the floor pan adjacent and attachment flange of a seat support member.

BRIEF DESCRIPTION OF THE DRAWINGS

These and other objects, advantages, and features of the present invention will be apparent to those skilled in the art upon reading the following description with reference to the accompanying drawings, in which:

FIG. 4 is an exploded, perspective view of an alternative embodiment of a seat support assembly according to the present invention.

DETAILED DESCRIPTION OF THE PREFERRED EMBODIMENT

Figure 1:
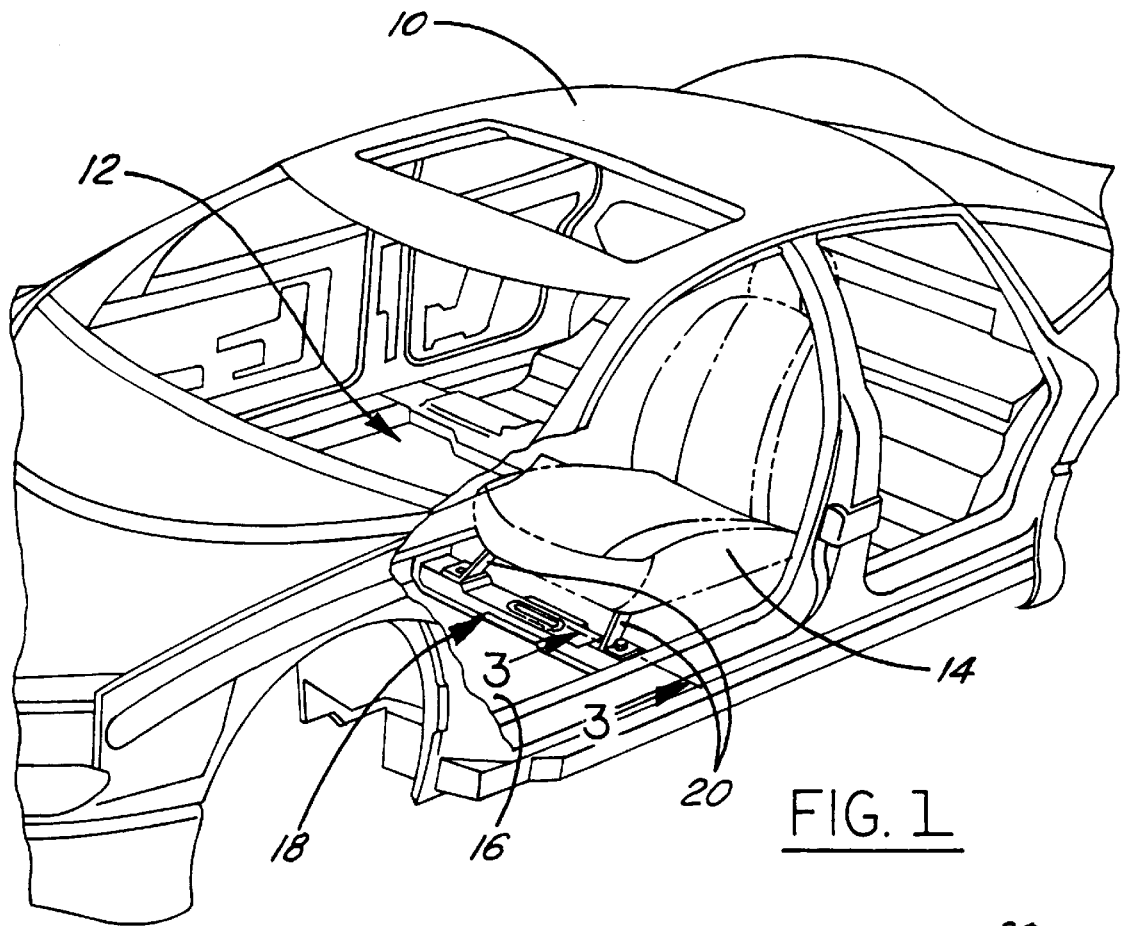
FIG. 1 is a partial perspective view of a vehicle having a seat with integrated restraints attached to the seat support assembly of the present invention.

Turning now to the drawings, and in particularly to FIG. 1 thereof, a vehicle 10 has a passenger compartment 12 in which a seat 14 is mounted to a floor pan 16 by a seat support assembly 18 according to the present invention. Those skilled in the art will recognize that the seat 14 has seat supports, or seat brackets 20, attached on an underside thereof for attachment with the seat support assembly 18.

Figure 2:
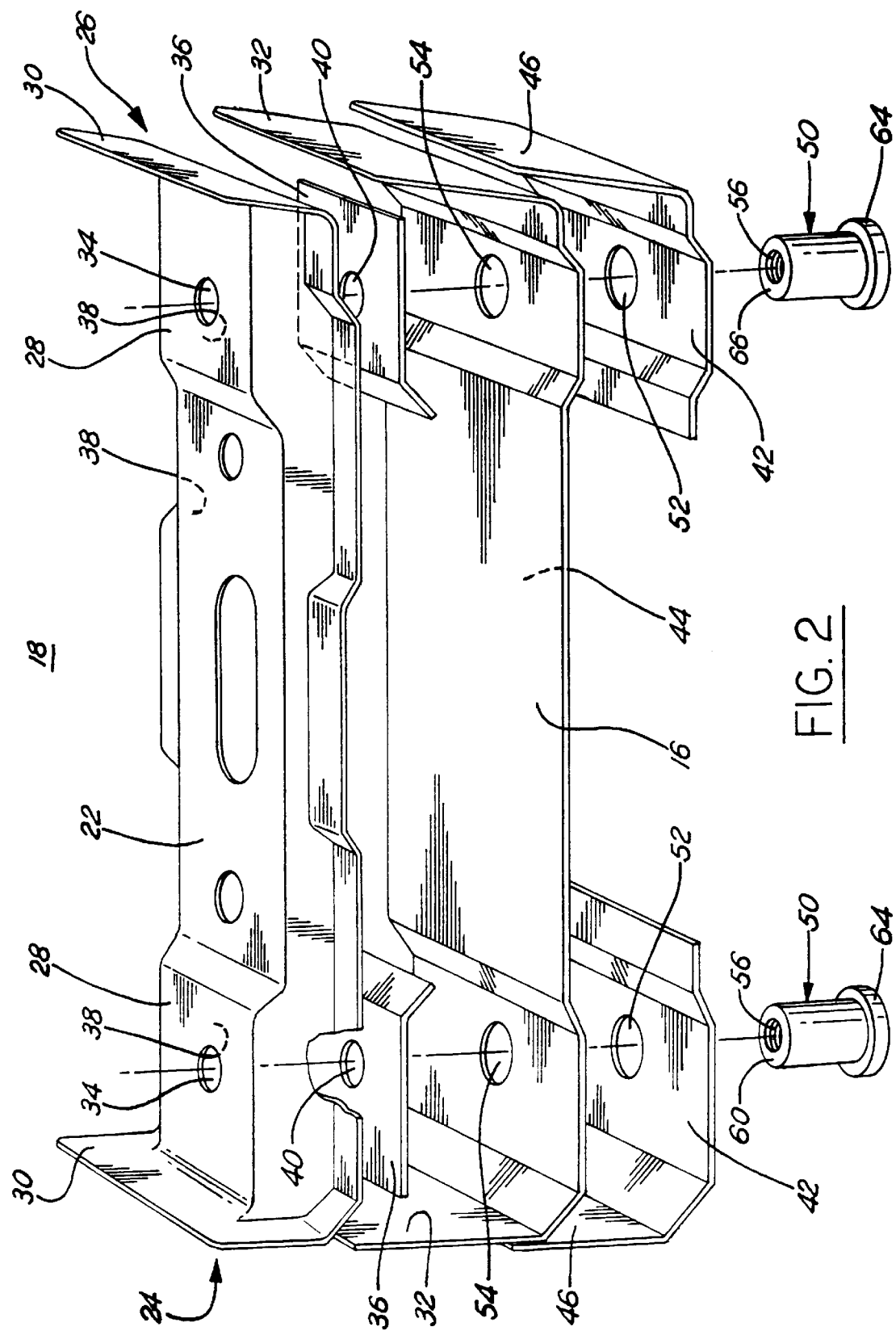
FIG. 2 is an exploded, perspective view of a seat support assembly according to the present invention.

Turning to FIG. 2, an exploded perspective view of a preferred embodiment of the seat support 18 of the present invention is shown. The seat support assembly has a transversely extending seat support member 22 with opposed ends 24, 26. Each of the opposed ends 24, 26 has a seat attachment section 28 and an attachment flange 30. The attachment flanges 30 are formed so as to conform with adjacent surfaces 32 of the floor pan 16. The attachment flanges 30 may extend around the periphery the seat support member 22. Each of the seat attachment sections 28 has an attachment hole 34 there and for receiving an attachment means, as further discussed below. Preferably, the seat support member 22 is made of stamped steel as is known in the art.

Figure 3:
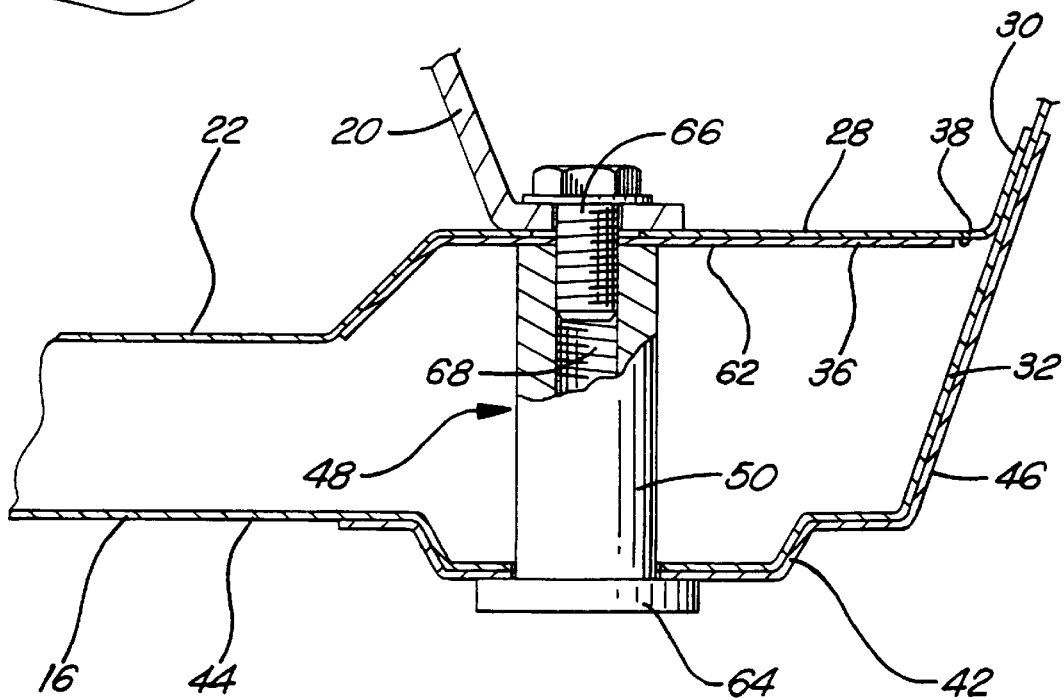
FIG. 3 is a cross-sectional view of a seat support assembly according to the present invention taken along the line 3—3 of FIG. 1.

The seat support assembly 18 has a pair of seat reinforcement members 36 adjacent and underside 38 of the attachment sections 28 and (FIGS. 2 and 3). The seat support reinforcement members 36 have attachment holes 40 which align with the holes 34 of the seat support member 22. Preferably, the seat support reinforcement members 36 are made of steel and are stamped to conform to the shape of the under surface 38 of the seat attachment sections 28, and may have a mating flange adapted for mating between the attachment flange 30 of the seat support member and the upstanding side portions 32 of the floor pan 16. The seat support members 36 are preferably attached by welding, but may be secured to the seat support member 22 by other means known to those skilled in the art.

Referring now to FIGS. 2 and 3, the seat support assembly 18 of the present invention has a pair of floor pan reinforcement members 42 adapted for mating with an underside 44 of the floor pan 16. The floor pan reinforcement members 42 have connection flanges 46 which wrap around an outer surface of the upstanding side portions 32 of the floor pan 16 adjacent the attachment flanges 30.

The seat support member 22, the seat support reinforcement members 36, and the floor pan reinforcement members 42 are attached to the floor pan 16 and to the seat brackets 20 preferably by a bolt and bolt sleeve attachment combination 48 (FIG. 3). The bolt and bolt sleeve combination 48 has a bolt sleeve 50 passing through openings 52, 54 in the floor pan reinforcement members 42 and the floor pan 16, respectively, and has a bolt receiving aperture 56 in a first end 58 which aligns with the holes 34, 40 of the seat attachment sections 28 and the seat support reinforcement members 36, respectively (FIG. 2), when an end surface 60 of the bolt sleeve 50 is in a mated, flush relationship with an underside surface 62 of the seat support reinforcement members 36 (FIG. 3). On a second end of the bolt sleeve 50 is a sleeve head 64 of sufficient size so as to prevent its passage through the openings, 52, 54 and which serves as an anchor for the bolt end sleeve combination. A bolt 66 is mounted through the bracket 20 (FIG. 3), through the bolt holes 34, 40 in the seat support member 22 and seat support reinforcement members 36, respectively, and into the bolt sleeve 50 where it is received by threaded, inter surface 68 (FIGS. 2 and 3). The bolt sleeve 50 thus maintains the seat support member 22 and a space relationship with the floor pan 16. Thus, by varying the thickness of the bolt sleeve 50, the seat support assembly 18 of the present invention can absorb greater loads through the seat brackets 20, such as those transmitted by a seat having integrated restraints. It should be understood that the seat support assembly of the present invention provides increased support for seats having integrated restraints may and be assembled without the seat support reinforcement members 36 but with the floor pan reinforcement members 42, or vice versa. It should also be understood that the length of the bolt sleeve 50 will also effect the load absorbing capabilities of the seat support assembly of the present invention.

Figure 5:
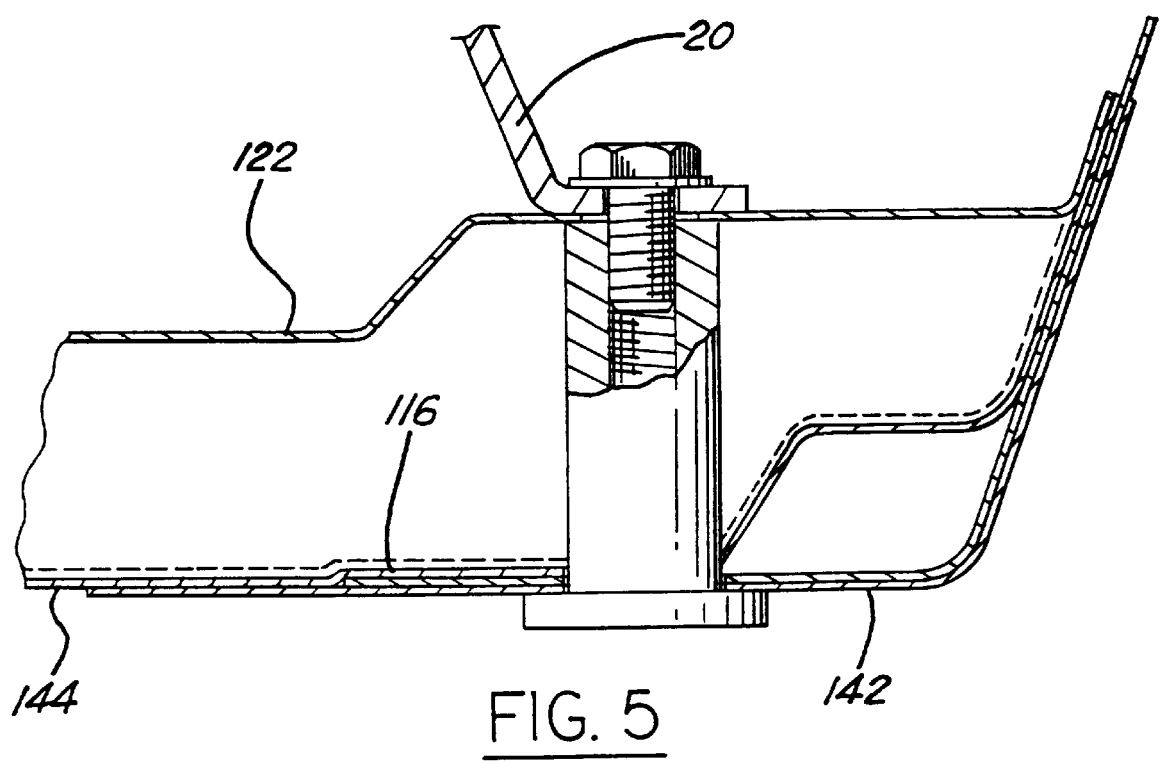
FIG. 5 is a cross-sectional view of the seat support assembly of FIG. 4 taken at a location similar to that of FIG. 3.

In an alternate embodiment of the present invention as seen in FIGS. 4 and 5, the floor pan reinforcement members 142 have a T-shaped portion adjacent the attachment flange 130 of the seat support member 122. In addition, the floor pan reinforcement members 142 also have a T-shaped base section 172 adjacent and underside 144 of the floor pan 116.

Although the preferred embodiment of the present invention has been disclosed, various changes and modifications may be made without departing from the scope of the invention as set forth in the appended claims.

What is claimed is:

1. A seat support assembly for an automotive vehicle having a floor pan and at least one seat with a plurality of seat brackets, the assembly comprising:

a transversely extending seat support member having opposed ends each with a seat attachment section and an attachment flange;

a pair of seat support reinforcement members adjacent an underside of the attachment section, one of the pair on each of the opposed ends of the seat support member;

at least one floor pan reinforcement member adapted for mating with an underside of the floor pan and having a reinforcement flange adapted for wrapping around an upstanding side portion of the floor pan adjacent the attachment flange; and seat attachment means adapted for connecting the plurality of seat brackets to the seat support member, the seat attachment means adapted to be anchored to an underside of the floor pan reinforcement member.

2. The seat support assembly according to claim 1 wherein the at least one floor pan reinforcement member has a T-shaped portion adjacent the mating flange and the attachment flange.

3. The seat support assembly according to claim 1 wherein the at least one floor pan reinforcement member has a T-shaped base section adapted to be positioned adjacent an underside of the floor pan.

4. The seat support assembly according to claim 1 wherein the pair of seat support reinforcement members and the floor pan reinforcement members are made of stamped steel.

5. An integrated occupant restraints seat and support assembly for an automotive vehicle having a floor pan, the assembly comprising:

a seat having integrated occupant restraints;

a plurality of seat brackets mounted to the seat;

forward and rearward transversely extending seat support members each having opposed ends with a seat attachment section and an attachment flange;

a pair of seat support reinforcement members adapted to be positioned adjacent an underside of the attachment section on each of the opposed ends of the forward and rearward seat support members, each of the pair of seat support reinforcement members having a mating flange adapted for mating between the attachment flange and a portion of the floor pan;

a floor pan reinforcement member adapted for mating with an underside of the floor pan and adapted for wrapping around an outer side of the floor pan adjacent the mating flange and the attachment flange; and seat attachment means for connecting the plurality of seat brackets to the seat attachment sections of the seat support members, the seat attachment means adapted to be anchored to an underside of the floor pan reinforcement member.

6. The seat support assembly according to claim 5 wherein the at least one floor pan reinforcement member has a T-shaped portion adjacent the mating flange and the attachment flange.

7. The seat support assembly according to claim 6 wherein the at least one floor pan reinforcement member has a T-shaped base section adapted to be positioned adjacent an underside of the floor pan.

\* \* \* \* \*